(12) United States Patent
Wolf et al.

(10) Patent No.: US 8,196,738 B1
(45) Date of Patent: Jun. 12, 2012

(54) CERAMIC PULLEY LAGGING

(75) Inventors: Tim Wolf, Pella, IA (US); Darrell Huffine, Knoxville, IA (US); Matt Roozeboom, Pella, IA (US)

(73) Assignee: Precision, Inc., Pella, IA (US)

( * ) Notice: Subject to any disclaimer, the term of this patent is extended or adjusted under 35 U.S.C. 154(b) by 0 days.

(21) Appl. No.: 13/068,260

(22) Filed: May 6, 2011

Related U.S. Application Data

(60) Provisional application No. 61/395,083, filed on May 7, 2010.

(51) Int. Cl.
*B65G 23/04* (2006.01)
(52) U.S. Cl. .......................................... 198/835; 474/190
(58) Field of Classification Search ................ 198/832, 198/834, 835; 474/190, 192
See application file for complete search history.

(56) References Cited

U.S. PATENT DOCUMENTS

| | | | | |
|---|---|---|---|---|
| 4,290,761 A * | 9/1981 | Suginaka | ...................... | 198/835 |
| 4,718,544 A * | 1/1988 | Herren | .......................... | 198/843 |
| 6,082,527 A * | 7/2000 | Bruhmann et al. | .......... | 198/835 |
| 6,143,404 A * | 11/2000 | Bruhmann et al. | .......... | 198/835 |
| 6,168,544 B1 * | 1/2001 | Barnes et al. | ................. | 198/835 |
| 6,692,392 B2 * | 2/2004 | Finnegan et al. | ............. | 474/190 |
| D518,616 S * | 4/2006 | Goodwin | ...................... | D34/35 |

* cited by examiner

*Primary Examiner* — James R Bidwell
(74) *Attorney, Agent, or Firm* — G. Brian Pingel; Camille L. Urban; David M. Breiner

(57) ABSTRACT

A lagging for a belt conveyor pulley comprises a continuous and homogeneous rubber volume and a number of small plate-like ceramic lagging elements. The ceramic elements may be of rectangular, square, oval or circular shape in various patterns with and without grooving. The lagging is hot vulcanization bonded to the periphery of a pulley in a manner without seams or other paths for liquid or debris ingress to pulley rubber bond.

8 Claims, 2 Drawing Sheets

CERAMIC PULLEY LAGGING

RELATED U.S. APPLICATION DATA

Provisional Application No. 61/395,083 filed on May 7, 2010

BACKGROUND OF THE INVENTION

1. Field of the Invention

The present invention relates generally to a mechanical pulley lagging used on belt conveyors for the purpose of improving drive pulley traction and increasing pulley lagging wear life.

2. Description of the Prior Art

It can be appreciated that pulley coverings have been used for many years for the purpose of improving pulley to belt traction and wear protection. The most common covering has been lagging with a rubber or other polymer covering, which is applied to the pulley outside diameter. For higher performance, other materials, such as ceramic, are used.

Ceramics have demonstrated much higher traction and wear performance. The challenge with ceramic has been in excessive conveyor belt wear and difficulty in creating and keeping the ceramic attached to the pulley. Many variants of ceramic, metal and polymer combinations have been used in various dimensional schemes. Methods of pulley attachment have also been quite diverse with gluing, welding, bolting and revulcanizing common.

Older ceramic pulley laggings use coarse ceramic materials molded to a steel backing. The steel backing is shaped to match the pulley periphery and is separated into two or three circumferential sections. These sections are then bolted, welded or glued to the pulley periphery. These products are successful at improving pulley wear and traction characteristics. They tend to fall short due to a tendency for aggressive belt wear and installation difficulty from close tolerances.

Developments using smooth dimpled ceramic tiles have reduced belt wear while retaining the improved pulley wear and traction characteristics. Approximately 1 mm dimples on the ceramic tile indent into the belt's rubber cover, creating a mechanical "gear" type link. This link results in effectively high "friction" equivalents. Geometric variances in pulley or belt and tension changes from power transfer generate varying shear forces throughout the contact surface. Locally high shear forces are inevitable and the smooth ceramic surface minimizes belt abrasion if local slips occur. This concept is currently state of the art, although it should be noted the belt wear improvement can be negated by introduction of an abrasive contaminate or a global slip between pulley and belt.

Ceramic tiles are currently attached to pulleys in these ways.

Directly bonding the tiles to the pulley periphery.

Molding the tiles into a rubber strip with metal backing and bonding, welding or retaining the strip with separate clips welded or bolted to the pulley periphery.

Placing the tiles with uncured rubber and hot vulcanizing them during the curing process.

Molding the tiles into a rubber strip and bonding the strip to the pulley periphery.

Direct bonding of tiles to the pulley periphery has been performed successfully, although it has not achieved universal acceptance. Concerns over the rigid attachment increasing local slip and thus a higher risk of belt wear have been shown to occur. Theoretical models are emerging in the industry supporting this concern.

Tiles molded into a rubber strip and metal backing have been used successfully, typically in specific lower tension situations. Bonding of the metal backing to the pulley periphery makes it a redundant component. Bolting and welding create stress risers in the pulley complicating its design. Retaining clips have load capacity limits.

Placing the tiles with uncured rubber and creating a bond during the vulcanization process has been demonstrated in the industry. With the vast array of pulley diameters and face widths this currently uses time consuming hand tile placement and tiles tend to move as the rubber cures creating an uneven surface not ideal for some applications. Pulley size variations make use of tile positioning molds prohibitive.

The most common tile attachment is by molding tiles into a rubber strip and bonding the strip to the pulley periphery. Strip molds are rigidly designed to create a standard width, some limited length variability and provision to position ceramic tiles in a preset pattern. These standardized strips are manually bonded one by one on the pulley periphery with the width parallel to the pulley circumference and length trimmed to the pulley face width. Successive strips result in butt, or in some cases lap, joints along the face width with gaps which are then filled.

The main problem with current ceramic tile lagging is the inability to attach the tiles in a cost effective manner and consistently achieve the reliability of other rubber lagging bonds.

It is generally accepted the highest reliability bonds are those made by hot vulcanizing in an autoclave or press due to the ability to better control variables. Current ceramic tile lagging uses a press cured bond from tile to rubber and a manual bond from rubber to pulley periphery. Small bond deficiencies can grow under the stress of use and result in catastrophic bond failures. In practice, this manual rubber to pulley bond is most critical since loss of a strip will likely result in downtime to repair while the press cured tile bonds are independent and many tiles can be lost before repair is necessary. Furthermore the manual butt or lap joints between strips present a location more likely to allow liquids or debris to be pushed into the rubber to pulley bond. It will become obvious the present invention improves reliability by correcting this joint reliability mismatch.

Another deficiency of present strip designs are the butt or lap seams create a linear recessed area running the entire, or a significant portion of the pulley face width, which creates noise and vibration from the intermittent belt contact when running. In addition, for easier tile setting most designs use linear tile and groove patterns resulting in the same effect. It will become obvious the present invention eliminates this effect without additional manufacture difficulty or expense.

Another deficiency of the present strip designs is that the process of tile setting for press cure and the process of manual pulley to rubber bond are separate processes which are commonly labor intensive. In addition, present designs use very few, and many times only one, ceramic tile patterns to minimize tooling and setup costs. It will become obvious the present invention improves cost by merging these two processes into one and increases flexibility of tile layout design.

Another deficiency of the current strip designs is the need to cut and trim the strip length to match pulley face width. Most designs require the purchase of different length product for each pulley face width, which complicates logistics. Further more design variables such as rubber thickness and type of compound require different finished strips further complicating logistics. It will become evident the present invention eliminates this labor and reduces logistical complications by minimizing components required.

Furthermore, it is inconvenient and at a point impossible to install the present ceramic strip designs on small diameter pulleys due to their bending stiffness and the resulting intermittent rubber to pulley periphery contact. It will become obvious the present invention overcomes this constraint making ease of manufacture independent of pulley diameter.

In these respects, the present invention substantially departs from the conventional concepts and designs of the prior art, and in doing so provides an apparatus primarily developed for the purpose of creating a more cost effective and higher reliability ceramic pulley lagging.

SUMMARY OF THE INVENTION

In view of the foregoing disadvantages inherent in the known methods of ceramic pulley lagging, the present invention provides improvements to deficiencies with a more cost effective and higher reliability design.

The general purpose of the present invention, which will be described subsequently in greater detail, is to provide a state of the art ceramic pulley lagging design that will result in a new concept of ceramic pulley lagging which is not anticipated, rendered obvious, suggested, or even implied by the prior art.

To obtain this, the present invention is generally comprised of a conveyor pulley, rubber lagging, a set of ceramic tiles and the necessary bonding agents for component attachment.

In this respect, before explaining the preferred embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood the phraseology and terminology employed herein are for the purpose of the description and should not be regarded as limiting.

A primary object of the present invention is to provide a ceramic pulley lagging that will overcome the shortcomings of previous art.

An object of the present invention is to provide an autoclave or press cure hot vulcanized bond between lagging rubber and pulley periphery.

Another object is that from the periphery the lagging is one continuous mass with no discontinuities, such as butt or lap joints, presenting a potential path for liquids or debris to follow to the pulley to rubber bond.

Another object is elimination of lengthy recesses parallel to the pulley face width having the potential to create undesirable noise or vibration.

Another object is the ability to easily vary tile density and pattern.

Another object is to eliminate pulley diameter as an installation constraint.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same become better understood when considered in conjunction with the accompanying drawings, in which like reference characters designate the same or similar parts throughout the several views, and wherein.

DESCRIPTION OF THE PREFERRED EMBODIMENT

Figure 1:
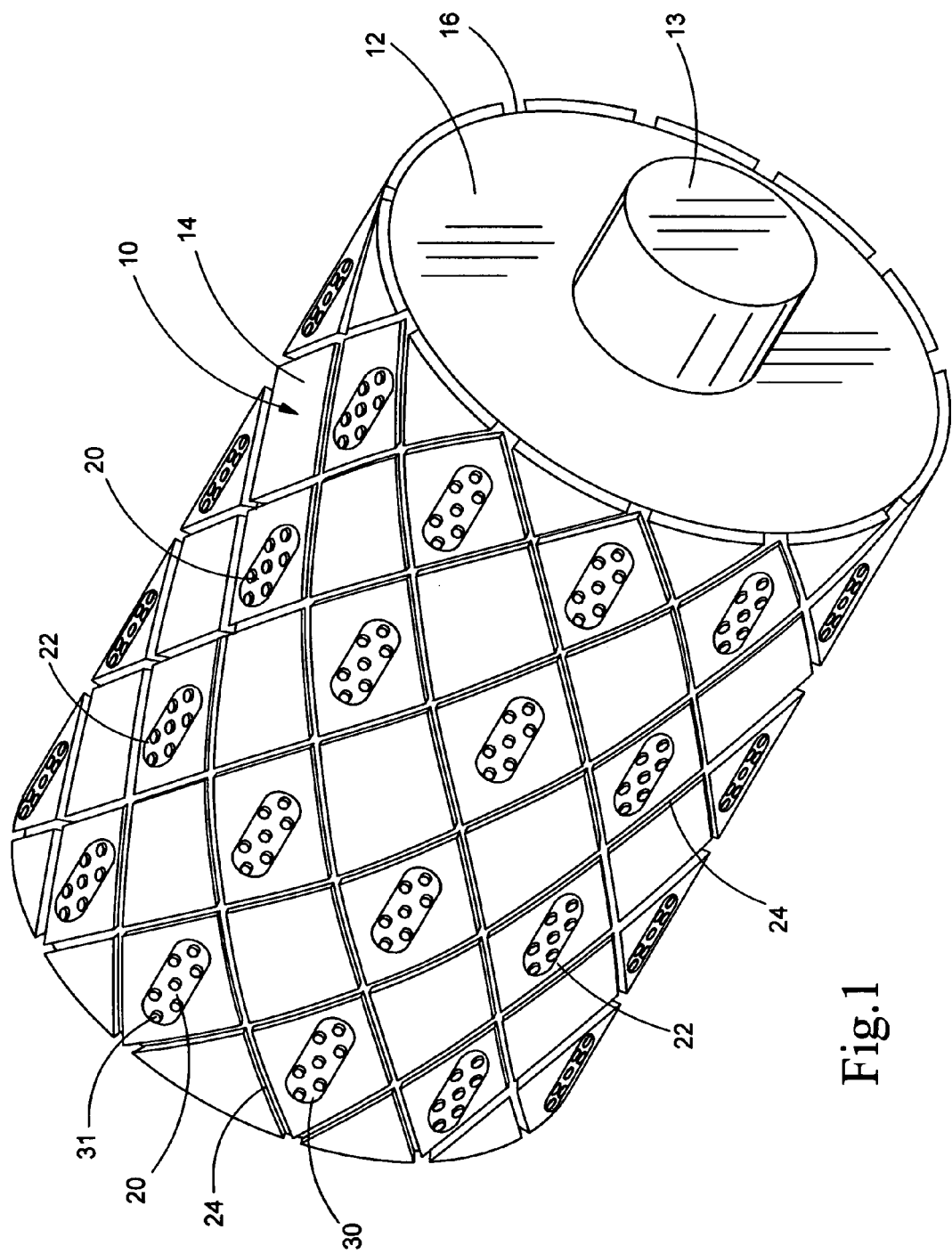
FIG. 1 is an isometric view of a preferred embodiment of a seamless hot vulcanized rubber lagging of the present invention with ceramic tile inserts.

Referring now to the drawings and with reference first to FIG. 1, a seamless hot vulcanized rubber lagging of the present invention is shown at 10 applied to a typical pulley 12. The lagging 10 is formed from a rubber strip 14 that is applied to the peripheral surface of the pulley 12 in an uncured condition and is then hot vulcanized as is well-known in the art to create a continuous homogeneous lagging volume of uniform thickness around the periphery of the pulley 12. Preferably, black 60 Shore A Durometer styrene butadiene rubber (SBR) is applied approximately ½ inch thick. Many compound, hardness and color variations exist. Common rubber options include chloroprene (neoprene), Natural, Butadiene Acrylonitrile (nitrile), and Ethylene Propylene (EPDM). Hardnesses range from 45-85 shore A durometer. Color is optional and usually is white or black. Thickness of the rubber can range from ¼ inch to 1 inch and even with multiple inch thicknesses at times.

Pulleys, such as the pulley 12, typically are cylindrical steel structures supported by a shaft 13 on their axis of rotation. Shaft and pulley may be rigidly attached and supported by pillow block or flange bearings on the conveyor structure or bearings may be used to connect pulley to a stationary shaft mounted to the conveyor structure. Typical pulley diameters range from 4-72 inches and the length, or face width, can be a few inches to over 132 inches. The outer pulley surface can be a uniform diameter along the entire face or can vary to create crowned faces. The most common being a continuous crown with the largest diameter at the center and the diameter uniformly reducing approximately ⅛" per foot toward either end. Roundness and straightness tolerances vary by the type of service with the belt type running over the pulley being the primary variable. Fabric belts can allow pulley TIR in the 0.125-0.188 inch range while high modulus steel cable belts require values in the 0.030-0.060 range.

The process for forming the seamless lagging 10 starts with preparing the pulley 12 for a bond with the lagging by physically removing debris such as scale, coatings, weld residue, rust, markings and grease from its outer peripheral surface 16. Typically this is done by grit blasting with clean medium. Shortly after cleaning, the surface 16 is primed preferably with Lord Chemlok 207 Primer to inhibit oxidization or contamination. Then, a thin layer of adhesive, preferably Lord Chemlok 234B adhesive, is applied to the pulley 12. An uncured layer of rubber and a compression wrapping are next applied to the pulley 12, which is now ready for curing.

Figure 2:
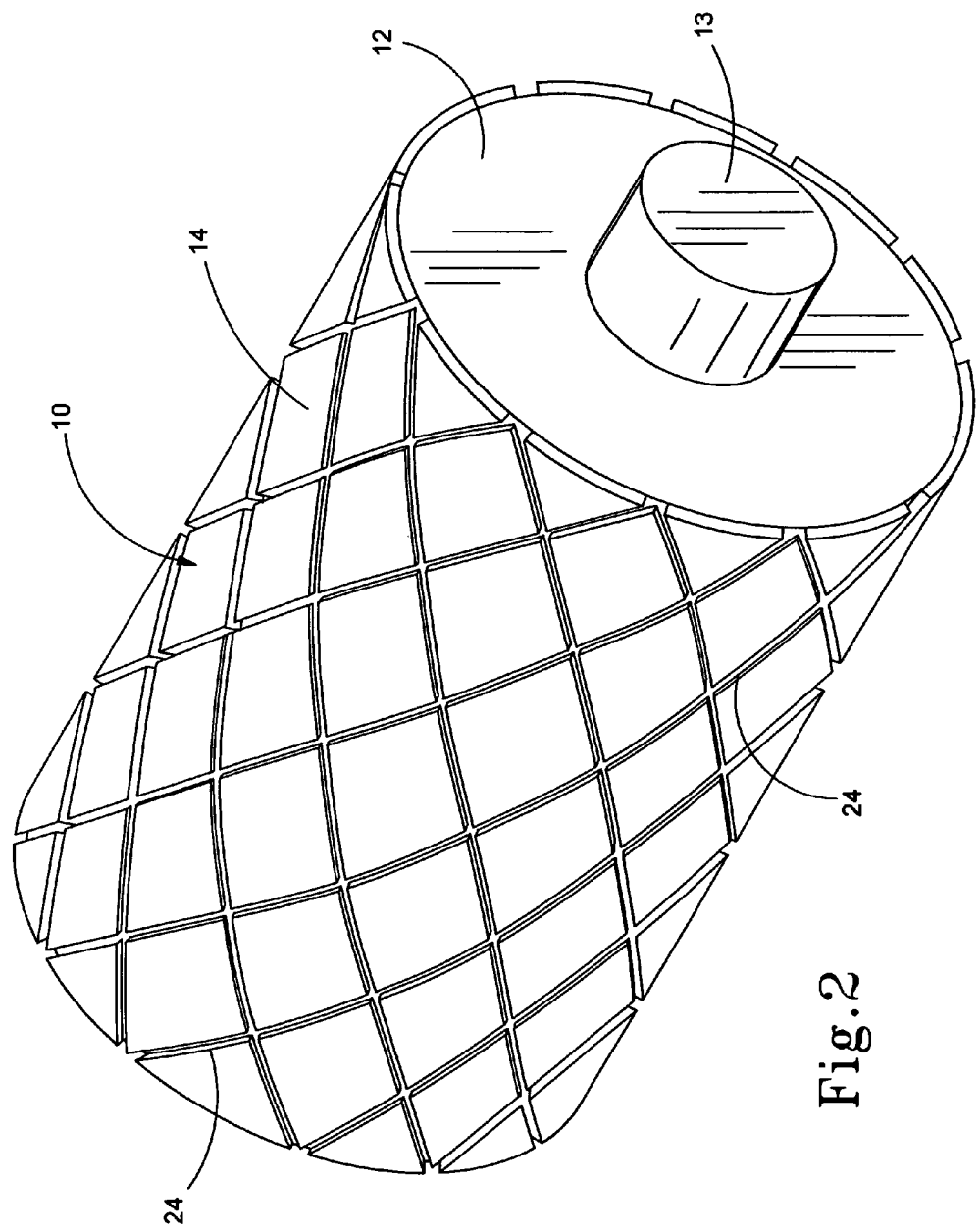
FIG. 2 is an isometric view of rubber applied in a raw state on a pulley and hot vulcanized to create one homogenous volume of rubber lagging without seams.

The pulley 12, secured with the uncured rubber layer is then placed in an autoclave and heated to approximately 250° F. and 50 psi. The autoclave time is a number of hours with duration varying by mass, thickness and compound being cured, but will generally range from two to four hours. Obviously, the larger the mass and thickness, the greater the number of hours to cure. After curing in the autoclave the compression wrap is removed to reveal the homogeneous strip 14 of rubber permanently bonded to the pulley's circumferential periphery as shown in FIG. 2. The next step in the process is to install a plurality of ceramic tiles 20 throughout the surface of the rubber strip 14 in a desired arrangement to form the lagging 10, such as shown in FIG. 1.

The tiles 20 are preferably made from high alumina ceramic. An oval shape ½ inch wide×1½ inch long×¼ inch deep has been found to work highly satisfactorily. This size preferably lends itself to a pocket cutting process developed by applicant, allows use on pulley diameters less than current capability and is of a similar area as that of current square tiles. The process also allows for the use of larger tile dimensions, which will naturally reduce the tile count on larger diameter and face width pulleys. The tiles 20 each have a generally planar face 30 from which a series of preferably ⅛ inch×¼ inch dimples 31 raised 1/16 inch extend outwardly therefrom.

Pockets 22 are cut in the rubber strip 14 after it has been hot vulcanized onto the pulley 12 that generally match the size of the tiles 20. A rotary knife tool as described in my co-pending application filed on even date herewith and incorporated by reference has been developed to be used in a milling type operation. Such operation could also be performed with a rotary hot wire cutter. Once the pockets 22 are cut, the tiles 20 are then primed and cold bonded therein to complete the lagging 10. As can be seen in FIG. 1, the tiles 20 are sized so that their planar faces 30 are co-extensive with the surface of the rubber strip 14 so that the dimples 31 extend above the strip 14. The dimples 31 are adapted to engage and deform the conveyor belt cover without cutting, which creates a mechanical gear like interface resulting in higher torque transfer capability than rubber only lagging to substantially minimize conveyor belt slippage.

By supporting the pulley 12 on its axis of rotation with the ability to index it circumferentially and providing index capability of the cutter with the pulley face width and radial from the pulley axis an infinite number of tile layout patterns are possible. FIG. 1 shows one likely pattern in combination with grooves 24 that can also be cut with a hot knife or molded in various patterns as desired.

The patterns of the grooves 24 typically are at an angle to the axis of rotation of the pulley 12 to promote shedding of liquids and minimize noise generation from belt intermittent contact. In this way many tile coverage densities, groove patterns and tile patterns can be created with the same basic tile shape.

What is claimed is:

1. A conveyor pulley lagging assembly that is adapted to be utilized with a conveyor belt to minimize conveyor belt slippage, said assembly comprising:
    (a) a cylindrically shaped pulley supported on axle shafts for rotation;
    (b) a cured layer of rubber secured to the outer surface of said pulley, said layer of cured rubber includes a pattern of grooves arranged at an angle to the axis of rotation of said pulley and said tiles are interspersed between said grooves;
    (c) a plurality of ceramic tiles;
    (d) a plurality of pockets generally of the same size as said tiles formed in the surface of said layer of cured rubber for receiving said tiles; and
    (e) said tiles are secured in said pockets and each of said tiles has a generally exterior planar face and a series of raised dimples extending outwardly therefrom.

2. The conveyor pulley lagging assembly as described in claim 1 wherein said tiles are formed in an oval shape and have a length three times longer than their width.

3. The conveyor pulley lagging assembly as described in claim 2 wherein said tiles are ½ inch×1½ inch×¼ inch deep and the dimples on said tiles are ⅛ inch×¼ inch and are raised 1/16 inch above the planar face of said tiles.

4. The conveyor pulley lagging assembly as described in claim 1 wherein said tiles are secured in said pockets by cold bonding.

5. The conveyor pulley lagging assembly as described in claim 1 wherein said layer of rubber is black 60 shore A durometer styrene butadiene rubber approximately ½ inch thick and was initially secured on said pulley in an uncured condition and then cured in an autoclave.

6. A process for forming a seamless rubber lagging covering for a cylindrically shaped pulley comprising the following steps in the order recited:
    (1) Removing debris from the surface of said pulley;
    (2) Applying a layer of adhesive to the surface of said pulley;
    (3) Applying an uncured layer of rubber to the surface of said pulley together with a compression wrapping;
    (4) Heating said pulley with said uncured rubber layer in an autoclave at a temperature of approximately 250° F. and 50 psi until said rubber layer is cured;
    (5) Removing the compression wrap from said pulley;
    (6) Forming a plurality of spaced apart pockets in the surface of said rubber layer;
    (7) Installing a ceramic tile in each of said pockets, which tiles each have a planar surface and a series of raised dimples extending outwardly therefrom; and
    (8) Securing said tiles in said pockets.

7. The process as described in claim 6 wherein said tiles are secured in said pockets by cold bonding.

8. The process as described in claim 6 wherein said tiles each have an oval shape ½ inch wide by 1½ inch long by ¼ inch deep.

* * * * *